United States Patent
Allgaeuer et al.

(10) Patent No.: US 12,463,272 B2
(45) Date of Patent: Nov. 4, 2025

(54) TEMPERATURE CONTROL DEVICE FOR THE TEMPERATURE CONTROL OF AN ELECTRICAL ENERGY STORE FOR A MOTOR VEHICLE, AND MOTOR VEHICLE

(71) Applicant: Bayerische Motoren Werke Aktiengesellschaft, Munich (DE)

(72) Inventors: Christian Allgaeuer, Munich (DE); Thomas Glass, Mainburg (DE); Dominik Gruber, Munich (DE); Alexander Lichtenberger, St. Peter in der Au (AT); Rene Pichlbauer, Sankt Marien (AT); Andreas Siuka, Kematen an der Krems (AT)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 521 days.

(21) Appl. No.: 17/968,032

(22) Filed: Oct. 18, 2022

(65) Prior Publication Data

US 2023/0122625 A1    Apr. 20, 2023

(30) Foreign Application Priority Data

Oct. 19, 2021   (DE) ..................... 10 2021 127 086.3

(51) Int. Cl.
*H01M 10/6568*   (2014.01)
*B60L 58/26*   (2019.01)
(Continued)

(52) U.S. Cl.
CPC ..... *H01M 10/6568* (2015.04); *H01M 10/486* (2013.01); *H01M 10/613* (2015.04);
(Continued)

(58) Field of Classification Search
None
See application file for complete search history.

(56) References Cited

U.S. PATENT DOCUMENTS

2018/0236842 A1   8/2018  Allgaeuer et al.
2018/0319246 A1  11/2018  Allgaeuer et al.
(Continued)

FOREIGN PATENT DOCUMENTS

DE   10 2012 024 080 A1   3/2014
DE   10 2015 220 623 A1   4/2017
(Continued)

OTHER PUBLICATIONS

German-language Search Report issued in German Application No. 10 2021 127 086.3 dated Jun. 10, 2022 with partial English translation (12 pages).

*Primary Examiner* — Scott J. Chmielecki
(74) *Attorney, Agent, or Firm* — Crowell & Moring LLP (57) ABSTRACT

A temperature control device for temperature control of an electrical energy store for a motor vehicle includes a feed line element which is flushable by a temperature control fluid for the temperature control of the energy store, and which constitutes a first line element via which the temperature control fluid flowing in the feed line element can be admitted to the energy store, and includes a return line element which is flushable by the temperature control fluid, and which constitutes a second line element via which temperature control fluid flowing in the energy store can be evacuated from the energy store. The line elements are arranged in a housing which is common to the line elements, in which a housing bypass line element which is fluidically connected or connectable to the line elements is arranged, by way of which the energy store can be bypassed by the temperature control fluid.

10 Claims, 2 Drawing Sheets

(51) Int. Cl.
  *B60L 58/27*  (2019.01)
  *H01M 10/48*  (2006.01)
  *H01M 10/613*  (2014.01)
  *H01M 10/615*  (2014.01)
  *H01M 10/625*  (2014.01)

(52) U.S. Cl.
  CPC ....... *H01M 10/615* (2015.04); *H01M 10/625* (2015.04); *B60L 58/26* (2019.02); *B60L 58/27* (2019.02); *H01M 2220/20* (2013.01)

(56) References Cited

U.S. PATENT DOCUMENTS

| | | | | |
|---|---|---|---|---|
| 2019/0241093 | A1* | 8/2019 | Shimauchi | H01M 10/6563 |
| 2019/0277184 | A1* | 9/2019 | Ogura | B60K 11/02 |
| 2019/0299812 | A1* | 10/2019 | Du | H01M 10/6567 |
| 2020/0108688 | A1* | 4/2020 | Gruber | H01M 10/656 |
| 2020/0127352 | A1* | 4/2020 | Tokozakura | F16N 39/02 |
| 2020/0198497 | A1* | 6/2020 | Honjo | H01M 10/625 |
| 2020/0231023 | A1* | 7/2020 | Sathasivam | H01M 10/633 |
| 2020/0240869 | A1* | 7/2020 | Yesh | G01M 3/38 |
| 2021/0061115 | A1* | 3/2021 | Honjo | B60L 53/24 |
| 2021/0206292 | A1* | 7/2021 | Beyer | H01M 10/6552 |
| 2022/0085435 | A1* | 3/2022 | Honjo | H01M 10/663 |
| 2022/0102692 | A1* | 3/2022 | Leffert | H01M 10/6556 |

FOREIGN PATENT DOCUMENTS

| | | |
|---|---|---|
| DE | 10 2016 200 362 A1 | 7/2017 |
| DE | 10 2017 123 274 A1 | 4/2019 |
| KR | 10-2011-0004206 A | 1/2011 |

* cited by examiner

TEMPERATURE CONTROL DEVICE FOR THE TEMPERATURE CONTROL OF AN ELECTRICAL ENERGY STORE FOR A MOTOR VEHICLE, AND MOTOR VEHICLE

CROSS REFERENCE TO RELATED APPLICATION

This application claims priority under 35 U.S.C. § 119 from German Patent Application No. 10 2021 127 086.3, filed Oct. 19, 2021, the entire disclosure of which is herein expressly incorporated by reference.

BACKGROUND AND SUMMARY OF THE INVENTION

The invention relates to a temperature control device for the temperature control of an electrical energy store for a motor vehicle. The invention further relates to a motor vehicle, particularly a motor car.

A heating system for an electric or hybrid vehicle is known from DE 10 2015 220 623 A1, having a cooling circuit, a heating heat-exchanger, which is arranged in a heating circuit, and a high-voltage store. Moreover, DE 10 2012 024 080 A1 discloses a vehicle having at least one electric motor. Furthermore, a heating system for an electric or hybrid vehicle is known from DE 10 2016 200 362 A1.

The object of the present invention is the provision of a temperature control device for the temperature control of an electrical energy store of a motor vehicle, and of a motor vehicle, such that a particularly high degree of safety in the energy store can be achieved in a particularly simple manner.

This object is fulfilled by a temperature control device and by a motor vehicle having the features of the claimed invention.

A first aspect of the invention relates to a temperature control device for the temperature control, i.e. for the cooling and/or heating of an electrical energy store for a motor vehicle. This means that the motor vehicle, which is preferably configured in the form of a motor car, particularly as a passenger motor car, in its fully-finished state, comprises the electrical energy store, by way of which electrical energy can be stored. The electrical energy store is preferably a high-voltage component, the electric voltage of which, particularly the electric operating and rated voltage, is preferably greater than 50 volts, particularly greater than 60 volts, and more preferably is several hundred volts. Accordingly, the energy store is also described as a high-voltage store (HVS). In particular, the energy store can be a battery, particularly a high-voltage battery (HV battery). The motor vehicle can comprise at least one electrical machine, which is operable, for example, by way of electrical energy which is stored in the energy store, and by way of which the motor vehicle, particularly exclusively, can be electrically propelled. The motor vehicle can thus be configured, for example, in the form of a hybrid or electric vehicle, particularly in the form of a battery electric vehicle. It is also preferable that the electrical machine should be a high-voltage component, the electric voltage of which, particularly the electric operating and rated voltage, is preferably greater than 50 volts, particularly greater than 60 volts, and more preferably is several hundred volts. As a result, particularly high electrical capacities can be achieved for the propulsion of the vehicle, particularly exclusively, by electricity. In particular, the energy store is configured for the electrochemical storage of energy. To this end, for example, the energy store comprises a plurality, particularly of individual storage cells, by way of which electrical energy is stored. The individual cells are electrically interconnected. It is moreover conceivable that the energy store comprises a store housing, in which the storage cells can be arranged. It is thus conceivable that the store housing delimits a location space, also described as an interior space, in which the storage cells can be arranged. In particular, where the temperature control device or temperature control fluid is configured or employed for the cooling of the energy store, the temperature control fluid is a cooling fluid, or the temperature control fluid is employed as a cooling fluid, wherein the cooling fluid is also described as a coolant.

The temperature control device comprises a feed line which is flushable by a preferably liquid temperature control fluid for the purposes of temperature control, i.e. for the cooling and/or heating of the energy store, which constitutes a first line element of the temperature control device, also described as the first line element. The temperature control fluid preferably at least comprises water. Via the first line element (feed line element), temperature control fluid can be admitted to the energy store. By the feature whereby temperature control fluid can be admitted via the feed line element to the energy store, it is particularly to be understood that, by way of the feed line element, temperature control fluid flowing in the feed line element is conveyed to the energy store, particularly to the store housing and, in consequence, can be introduced into the energy store, and particularly into the store housing. It is particularly provided that the feed line element is routed externally to the energy store, i.e. externally to the store housing, and thus externally to the location space. Accordingly, temperature control fluid can be infed to the energy store, via the feed line element, from the exterior of the energy store, i.e. from the exterior of the store housing.

The temperature control device moreover comprises a return line element, which is described as a second line element of the temperature control device, or as the second line element. Accordingly, temperature control fluid, particularly after it has flowed through the energy store, and particularly through the store housing, can be removed from the energy store, and particularly from the store housing, i.e. is evacuated from the energy store or discharged from the energy store. It is particularly conceivable that the return line element is routed externally to the energy store, and thus externally to the store housing and externally to the location space. For example, the line elements are solid bodies, or the line elements are ducts which are delimited, particularly directly, by respective solid bodies, wherein the respective solid bodies which delimit the respective line elements can be configured separately from one another, or configured integrally. In particular, it is conceivable that the solid bodies are interconnected. For example, the line elements and the energy store, particularly the store housing, are arranged in a temperature control circuit which is flushed by the temperature control fluid, which is also described simply as the temperature control circuit, and which can be flushed by the temperature control fluid. On its path through the temperature control circuit, temperature control fluid, vis-à-vis the line elements and the energy store, can firstly flow through the feed line element, thereafter through the energy store, particularly through the store housing, and thereafter through the return line element such that, in the direction of flow of temperature control fluid flowing through the temperature control circuit, the feed line element is preferably arranged upstream of the energy store, particularly of the store housing, wherein the energy store, particularly the store housing, is arranged upstream of the return line element, such that the return line element is arranged downstream of the energy store, particularly of the store housing, and downstream of the feed line element. Accordingly, the energy store is arranged upstream of the return line element and downstream of the feed line element. In particular, it is conceivable that the energy store, particularly the store housing, is configured separately from the respective line element or from the respective solid body, wherein it is particularly conceivable that the respective solid body or the respective line element is bonded to the energy store, particularly to the store housing, and is thus retained in an energy store, particularly in a store housing.

In order, for example, to permit the heat-up of the energy store, and particularly the storage cells, by way of the temperature control fluid, heat from the temperature control fluid flow through the energy store can be transferred to the energy store, and particularly to the storage cells, particularly if the temperature control fluid assumes a higher temperature than the energy store, or particularly than the storage cells. Alternatively or additionally, it is conceivable that the energy store, particularly the storage cells, are cooled by way of the temperature control fluid. To this end, heat is transferred from the energy store, particularly from the storage cells, to the temperature control fluid flowing through the energy store, particularly if the temperature control fluid assumes a lower temperature than the energy store, particularly than the storage cells.

In order to permit the achievement of a particularly high degree of safety in the energy store, in a particularly simple, and thus cost-effective manner, it is provided according to embodiments of the invention that the line elements are arranged in a housing which is common to the line elements, and is also described as the line element housing. Any reference to a housing hereinafter, unless indicated otherwise, is to be understood as a reference to the line element housing. The housing is formed by or comprises, for example, the above-mentioned solid bodies. It is thus conceivable, for example, that the housing delimits the line elements, particularly in a respectively direct manner. For example, the housing is configured as a one-piece component, or the housing can also be of sectional construction, and can thus comprise at least two separately configured and mutually bonded housing sections. In particular, the line elements are voids, which are immaterial per se, arranged and oriented in the housing, preferably longitudinally, through which the temperature control fluid can flow. For example, the voids are delimited by the housing, particularly directly. It is moreover conceivable that the voids are delimited, particularly directly, by at least one or more additional components, which are configured separately from the housing in the form of solid bodies, and are arranged in the housing.

For example, line elements which are preferably routed externally to the energy store, particularly to the store housing, are fluidically connected to at least one flow channel, which is routed in the energy store, particularly in the store housing, and which can be flushed by the temperature control fluid, such that temperature control fluid flowing in the feed line element is discharged from the feed line element, is admitted to the flow channel, and can flow thereafter through the flow channel, and thus through the energy store, particularly through the store housing. Thereafter, temperature control fluid flowing in the flow channel is discharged from the flow channel, and thus from the energy store, particularly from the store housing, is admitted to the return line element and thus flows through the return line element, as a result of which temperature control fluid is conducted from the energy store via the return line element.

It is further provided according to embodiments of the invention that a bypass line element, which is fluidically connected or connectable to the line elements, is also arranged in the housing. The feed line element is also described as a feed or feed line, and the return line element is also described as a return line or a return. The bypass line element is also described as a bypass line, a bypass or bypass channel. By way of the bypass line element, the energy store can be bypassed, particularly by temperature control fluid flowing in the feed line element. By this, it is to be understood that temperature control fluid flowing in the bypass line element bypasses the energy store, and thus does not flow through the energy store, and particularly does not flow into the energy store, but rather, in particular, temperature control fluid flowing through the bypass line element can flow in a direct path, i.e. without flowing into the energy store or flowing through the energy store, from the feed line element to the return line element. The bypass line element is thus, in a manner of speaking, a short-circuit between the line elements which bypasses the energy store, wherein a short-circuit is to be understood as a short-circuit flow of temperature control fluid, directly between the line elements, which bypasses the energy store, i.e. which is not admitted to the energy store. In particular, the bypass line element is configured such that temperature control fluid flowing through the feed line element, i.e. at least a proportion, and particularly the full amount of temperature control fluid flowing through the feed line element is tapped-off from the feed line element and admitted to the bypass line element, which is thus flushed by temperature control fluid from the feed line element. By way of the bypass line element, temperature control fluid flowing through the bypass line element is conveyed from the feed line element to the return line element and admitted thereto, without the admission of temperature control fluid flowing through the bypass line to the energy store, and any throughflow thereof in the energy store. Again, in other words, the bypass line element can prevent temperature control fluid, i.e. at least a proportion of temperature control fluid which initially flows through the feed line element, from being admitted via the feed line element to the energy store. For example, in the event of a fault, which can result, for example, from an accident, it is possible for an excessive quantity of temperature control fluid to be admitted to the energy store. In particular, by this arrangement, any filling of the energy store with temperature control fluid can be prevented.

As the line elements and the bypass line element are arranged in the housing, the line elements, the bypass line element and the housing form a composite assembly, or are constituents of a composite assembly, which at least comprises the line elements, the bypass line element and the housing. This composite assembly is to be understood as a standalone structural unit which is thus, in particular, produced independently of the energy store and, in particular, is fitted entirely independently thereof, which is handled as a whole and, in particular, can be fitted to the energy store and removed from the energy store, particularly from the store housing. The invention is thus based particularly upon the following knowledge and considerations: for example, in the event of a fault in a temperature control circuit which, for example, is configured or which functions as a cooling circuit, it is desirable that the temperature control fluid, or a temperature control fluid stream formed by temperature control fluid should be interrupted, i.e. for example that the influx thereof from the exterior of the energy store to the energy store is prevented. In this manner, particularly safe conditions for occupants of the motor vehicle, and for persons present in the environment of the motor vehicle, can be ensured. In particular, it is desirable to prevent any filling of the energy store, particularly the store housing, with an excessive quantity of temperature control fluid, particularly if this then results in the mechanical failure of internal line passages, i.e. channels which are routed in the energy store and are essentially flushable by the temperature control fluid, such as, for example, the above-mentioned flow channel. Customarily, individual components, such as shut-off valves and/or bypass mechanisms, are employed to ensure the achievement of a sufficiently safe state, and thus a high degree of safety. However, the employment of such individual components is associated with a high degree of complexity in handling, particularly with respect to the fitting thereof for the production of the temperature control device, and thus of the energy store, and in the context of logistics for the conveyance and/or handling of individual components. The interconnection of routes for the conveyance of temperature control fluid can generate additional costs, and can be disadvantageous to the weight of the motor vehicle, particularly if a high number of individual components are employed for interconnection of routes for the conveyance of temperature control fluid. The above-mentioned problems and disadvantages can be prevented by embodiments of the invention, as at least the line elements (feed line elements and return line elements) form the above-mentioned structural unit, and thus the composite assembly, which constitutes a whole and which, in particular, can be handled and fitted independently of the energy store, by the production thereof in a preassembled state.

In order to permit the achievement of a particularly high degree of safety in a particularly appropriate manner, it is provided, in one embodiment of the invention, that a bypass valve element is also arranged in the housing, which is switchable between a supply state and a bypass state. For example, the bypass valve element is moveable relative to the housing, particularly translationally and/or rotationally, between at least one supply setting which actuates the supply state and at least one bypass setting which actuates the bypass state. In the supply state, temperature control fluid flowing in the feed line element can be admitted via the feed line element to the energy store, i.e. is conveyable to the energy store. In other words, in order to admit temperature control fluid flowing in the feed line element to the energy store, rather than the conveyance thereof via the bypass line element to the return line element, thus bypassing the energy store, the bypass valve element is set accordingly. In particular, it is conceivable that, in the supply state, a section of the feed line element which is arranged upstream of the bypass valve element, in the direction of flow of temperature control fluid flowing in the feed line element, is fluidically connected via the bypass valve element to the energy store, particularly to the flow channel. Alternatively or additionally, it is conceivable that, for example, the bypass line element, in the supply state, is isolated from the feed line element by way of the bypass valve element, particularly at a point arranged upstream of the energy store, and particularly in the housing such that, upstream of the energy store, and particularly in the housing, temperature control fluid cannot flow from the feed line element to the return line element via the bypass line element. Thus, by way of the bypass valve element, particularly the entire quantity of temperature control fluid flowing in the feed line element can be tapped-off from the feed line element, admitted to the bypass line and admitted via the bypass line to the return line element, bypassing the energy store, such that temperature control fluid flowing in the bypass line element is not admitted to the energy store and does not flow through the energy store.

As the bypass line element, particularly in its entirety, is routed in the housing, and thus preferably externally to the energy store, and as the line elements are arranged in the housing, and thus routed therein, temperature control fluid in the housing, externally to the energy store, can bypass the energy store and thus, bypassing the energy store, can flow directly from the feed line element to the return line element, via the bypass line element. As a result, the temperature control device, and thus the energy store which, in particular, can be a constituent of the temperature control device, can be produced in a time-saving and cost-effective manner.

A further embodiment is characterized in that the bypass valve element is electrically switchable, at least from the supply state to the bypass state. Preferably, the bypass valve can also be electrically switchable to the supply state. As a result, a particularly appropriate switchover of the bypass valve element is achievable, such that a particularly high degree of safety can be provided in a simple manner.

In order to permit the achievement of a particularly high degree of safety in a particularly simple manner, according to a further embodiment, a temperature sensor is provided in the housing, arranged in the feed line element, by way of which a temperature of the temperature control fluid flowing in the feed line element is detectable. It is thus possible to ensure that a maximum permissible feed temperature of temperature control fluid to the energy store is not exceeded. In other words, it can be ensured that temperature control fluid is not admitted to the energy store at an excessively high temperature. It is, for example, conceivable, particularly by way of an electronic computing device which can be a constituent of the temperature control device, that the bypass valve element is switchable, particularly by electrical devices only, in accordance with the temperature of the temperature control fluid detected the temperature sensor, at least from the supply state to the bypass state. For example, the temperature sensor can deliver, in particular, an electrical signal, which embodies the temperature of the temperature control fluid detected by the temperature sensor. The electronic computing device is configured, for example, to receive the signal. The electronic computing device can further be configured, according to the signal thus received, i.e. according to the temperature of the cooling fluid detected by the temperature sensor, to actuate the bypass valve element, particularly electrically, and thus to execute a switchover of the bypass valve element from the supply state to the bypass state. It can thus be prevented that temperature control fluid at an excessively high temperature is admitted to the energy store. For example, the bypass valve element, particularly by way of the electronic computing unit, is switched from the supply state to the bypass state, if it is determined, particularly by the electronic computing unit, that the temperature of temperature control fluid detected by the temperature sensors exceeds a definable or predefined threshold value.

As the bypass valve element is also arranged in the housing, the bypass valve element is likewise a constituent of the above-mentioned structural unit, such that the temperature control device, and thus the energy store, can be produced in a particularly simple, and thus a time-saving and cost-effective manner.

As the temperature sensor is arranged in the housing, the temperature sensor is likewise a constituent of the above-mentioned structural unit, such that the temperature control device can be produced in a particularly simple, and thus in a time-saving and cost-effective manner.

For the particularly advantageous detection of the temperature of temperature control fluid in the feed line element, thus permitting the achievement of a particularly high degree of safety, it is provided, according to a further configuration of the invention, that the temperature sensor is arranged in the direction of flow of temperature control fluid flowing in the feed line element, and thus delivered to and admitted to the energy store, upstream or downstream of the bypass valve element.

In a further and particularly advantageous embodiment of the invention, a valve element is arranged in the housing and in the return line element. The valve element is likewise a constituent of the structural unit, such that the temperature control device can be produced in a simple, and thus in a time-saving and cost-effective manner. By way of the valve element, any "backflow" of temperature control fluid from the return line element to the energy store can also be prevented. For example, the bypass line element, at a connection point, is fluidically connectable or connected to the return line element, such that temperature control fluid flowing in the bypass line element can be discharged from the bypass line element, at the connection point, and admitted to the return line element. It has proved to be particularly advantageous if, in the direction of flow of temperature control fluid flowing in the return line element, the above-mentioned valve element is arranged upstream of the connection point. It can thus be prevented that temperature control fluid flowing through the bypass line element, and bypassing the energy store, is admitted from the return line element to the energy store, as a result of which a particularly high degree of safety is achievable.

In order to keep costs particularly low, in a further configuration of the invention, it is provided that the valve element is configured in form, particularly of a spring-loaded non-return valve.

In order to permit the prevention of any backflow of temperature control fluid from the return line element to the energy store in a particularly appropriate and secure manner, according to a further configuration of the invention, it is provided that the valve element, particularly actively, is switchable between a connecting state and an isolating state. In the connecting state, a first longitudinal region of the return line element, arranged upstream of the valve element in the direction of flow of temperature control fluid flowing in the return line element, and thus flowing away from the energy store, is fluidically connected via the valve element to a second longitudinal region, arranged downstream of the first longitudinal region and downstream of the valve element, in the direction of flow of temperature control fluid flowing in the return line element, and thus flowing away from the energy store such that, particularly in a normal state, temperature control fluid can be removed from the energy store by the evacuation thereof from the energy store via the return line element. In other words, in the connecting state, the valve element permits temperature control fluid from the energy store flowing in the first longitudinal region to flow from the first longitudinal region to the second longitudinal region. In the isolating state, however, the longitudinal regions are separated from one another, such that temperature control fluid cannot flow from the second longitudinal region back into the first longitudinal region. It is particularly provided that the above-mentioned connection point is arranged in the second longitudinal region.

In particular, it is conceivable that the valve element is electrically switchable, and is thus switchable by the energization of the valve element, i.e. by the supply of the valve element with electric current, from the isolating state to the connecting state. It is preferably provided that, in a de-energized state of the valve element, i.e. where the supply of electric current to the valve element is suspended or terminated, the valve element assumes the isolating state, or is returned from the connecting state to the isolating state.

In order to permit the achievement of a particularly high degree of safety in a particularly appropriate manner, in a further configuration of the invention, it is provided that the valve element is mechanically, hydraulically or electrically switchable from the connecting state to the isolating state and/or from the isolating state to the connecting state. For example, the valve element can be moved relative to the housing, particularly translationally and/or rotationally, between at least one connecting setting which actuates the connecting state and at least one isolating setting which actuates the isolating state.

A second aspect of the invention relates to a motor vehicle, preferably configured in the form of a motor car, particularly a passenger motor car, comprising a temperature control device according to the first aspect of the invention. Advantages and advantageous configurations of the first aspect of the invention are to be considered as advantages and advantageous configurations of the second aspect of the invention, and vice versa.

Other objects, advantages and novel features of the present invention will become apparent from the following detailed description of one or more preferred embodiments when considered in conjunction with the accompanying drawings.

DETAILED DESCRIPTION OF THE DRAWINGS

In the figures, identical or functionally equivalent elements are identified by the same reference symbols.

Figure 1:
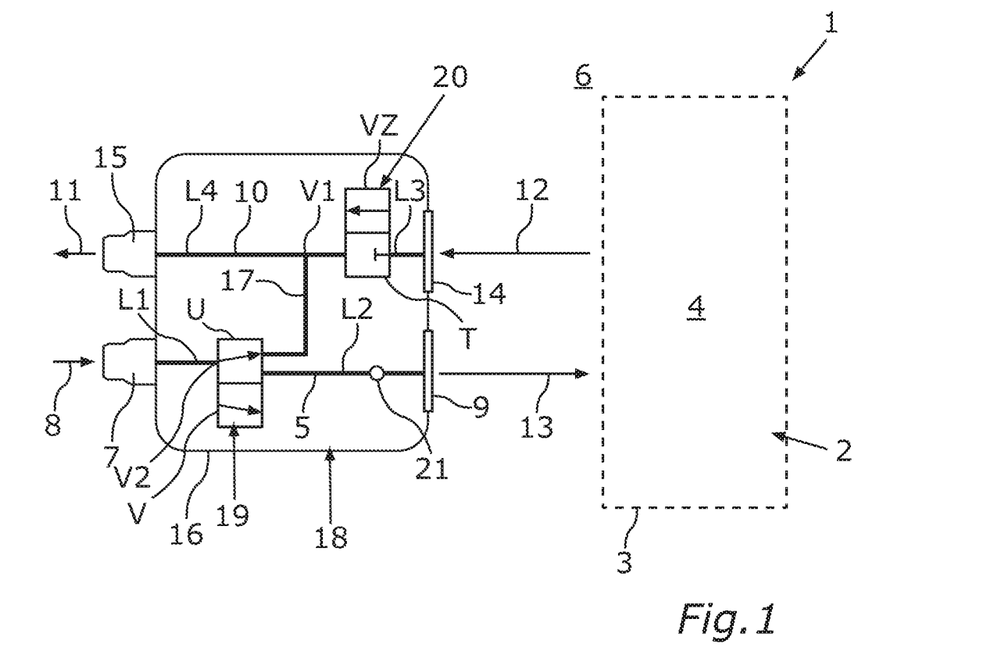
FIG. 1 shows a sectional schematic representation of a first embodiment of a temperature control device for the temperature control of an electrical energy store for a motor vehicle.

FIG. 1 shows a sectional schematic representation of a first embodiment of a temperature control device 1 for the temperature control of an electrical energy store 2 for a motor vehicle. This means that the motor vehicle, which is preferably configured in the form of a motor car, particularly as a passenger motor car, it its fully-finished state, comprises the temperature control device 1 and the energy store 2 which, in the present case, is a constituent of the temperature control device 1. The energy store 2 is a high-voltage component. The energy store 2 comprises a store housing 3 which, particularly directly, delimits a location space 4. The energy store 2 comprises storage cells, which are not represented in FIG. 1, which are configured separately from one another, and are thus configured in in the form of individual cells. By way of the storage cells, and thus by way of the energy store 2, electrical energy is storable or stored, particularly electrochemically. The storage cells are arranged in the location space 4.

The energy store 2 is arranged in a temperature control system which can be flushed by a temperature control fluid, and which is also described as a temperature control circuit. The temperature control fluid is preferably a liquid. By way of the temperature control fluid, the energy store 2, particularly the storage cells, can be temperature controlled, i.e. cooled and/or heated. It is preferably provided that the temperature control fluid is a coolant, or is at least employable as a coolant, by way of which the energy store 2, particularly the storage cells, can be cooled. The temperature control fluid can flow through the energy store 2, particularly the store housing 3, and thus controls the temperature of the energy store 2. In particular, at least one flow channel can be routed in the energy store 2, particularly in the store housing 3, which is flushable by the temperature control fluid. The energy store 2, particularly the storage cells, can thus be temperature-controlled by way of the flow channel, and by way of the temperature control fluid flowing in the flow channel.

The temperature control device 1 comprises a feed line element 5, which is also described as a feed line or feed, an infeed line element, infeed line or infeed. The feed is flushable by the temperature control fluid, and is preferably arranged in the temperature control circuit. Via the feed (the feed line element 5), temperature control fluid flowing in the feed can be admitted to the energy store 2, particularly to the store housing 3, and thus to the flow channel. From FIG. 1 it can be seen that the feed is routed externally to the energy store 2, in particular externally to the store housing 3, and is thus routed in an environment 6 of the energy store 2 which surrounds the energy store 2, particularly the store housing 3, such that, by way of the feed, temperature control fluid flowing in the feed can be introduced from the exterior of the energy store 2, i.e. from or out of the surrounding environment 6, into the energy store 2. To this end, the feed comprises an inlet 7 via which, as represented in FIG. 1 by an arrow 8, temperature control fluid can be admitted to the feed. The feed (feed line element 5) moreover comprises an outlet 9, via which temperature control fluid flowing in the feed can be evacuated from the feed, and thus admitted to the energy store 2. In the fully-finished state of the temperature control device 1, for example, the feed is fluidically connected via the outlet opening to the energy store 2, particularly to the flow channel. The temperature control device 1 moreover comprises a return line element 10, which is also described as a return line or return, and is flushable by or flushed by the temperature control fluid, particularly after the temperature control fluid has flowed through the feed and thereafter through the energy store 2, i.e. through the flow channel. Via the return, temperature control fluid flowing in the energy store 2 can be evacuated from the energy store 2, as indicated by the arrows 11 and 12. An arrow 13 indicates the temperature control fluid which flows through the outlet 9, and thus flows via the outlet 9 out of the feed and is admitted to the energy store 2, particularly to the flow channel.

The return (return line element 10) comprises a second inlet 14 via which, as indicated by the arrow 12, temperature control fluid flowing out of the energy store 2, particularly out of the flow channel, can be admitted to, or flows into the return. Thereafter, temperature control fluid flows out of the energy store 2 via the return. The return (return line element 10) comprises a second outlet 15, via which temperature control fluid flowing in the return, and thus flowing out of the energy store 2, is dischargeable from the return, and can thus be evacuated from the energy store 2. This is represented by the arrow 11. From FIG. 1, it can be seen that the line elements of the energy store 2 are thus routed in the environment 6, such that temperature control fluid which is discharged from the energy store 2, and which is admitted via the second inlet 14 to the return, flows out of the energy store 2 to or into the environment 6. Thus, for example, both the return and the feed are associated with the environment 6.

In order to permit the production of the temperature control device 1 in a particularly time-saving and cost-effective manner, and to simultaneously permit the achievement of a particularly high degree of safety, the line elements (feed and return) are arranged in a housing 16 which is common to the line elements. The housing 16 and the store housing 3 are configured separately from each other and, at least indirectly, and particularly directly, are mutually connected components. In particular, the housing 16 and the store housing 3, at least indirectly, and particularly directly, are mutually connected in a mechanical manner, as a result of which the feed and the return are fluidically connected to the energy store, particularly to the store housing 3, and more particularly to the above-mentioned flow channel. In particular, the arrow 12 indicates temperature control fluid flowing out of the flow channel, which is thus admitted to the return via the second inlet 14.

Moreover, a bypass line element 17 is arranged in the housing 16, which is preferably routed, in its entirety, within the housing 16. It can be seen that the housing 16 and the bypass line element 17 are arranged externally to the energy store 2. The bypass line element 17 is fluidically connected to the feed and the return, as a result of which the flow of temperature control fluid to the energy store 2, via the bypass line element 17, is diverted from the feed, i.e. at least from a subregion of the feed. This is described in greater detail hereinafter.

In the first embodiment represented in FIG. 1, the bypass line element 17 is fluidically connectable or connected to the return at a first connection point V1. Moreover, the bypass line element 17 is fluidically connectable or connected to the feed at a second connection point V2. The bypass line element 17 is also described as a bypass line, a bypass or a bypass channel. By way of the bypass line (bypass line element 17), at the connection point V2, temperature control fluid, particularly in its entirety, flowing in the feed can be tapped-off from the feed and admitted to the bypass line. Temperature control fluid which is tapped-off from the feed by way of the bypass line, and is thus admitted to the bypass line, flows through the bypass line and thus bypasses the energy store 2, such that temperature control fluid flowing in the bypass line is not admitted to the energy store 2 via the feed, and does not flow through the energy store 2. Temperature control fluid flowing in the bypass line is conveyed from the connection point V2 to the connection point V1 and, at connection point V1, is admitted to the return, whereafter temperature control fluid flowing in the bypass line can flow through the return line. By way of the bypass line, for example in the event of the occurrence of a leak in the energy store 2, for example in the flow channel, it can thus be prevented that an excessive quantity of temperature control fluid continues to flow via the feed, and an excessive quantity of temperature control fluid is thus admitted to regions arranged in the energy store 2 in which an excessive quantity of temperature control fluid might be disadvantageous.

The housing 16, the bypass line element 17, the feed line element 5 and the return line element 10 thus form, in particular, a fully-assembled and fitted structural unit 18 per se, considered in isolation and/or independently of the energy store 2, which is also described as a composite assembly. The structural unit 18 can particularly be handled in a pre-assembled and finished state and, in particular, can be fitted to the energy store 2, as a result of which the temperature control device 1 can be produced in a particularly simple, and thus in a time-saving and cost-effective manner. For example, in order to produce the temperature control device 1, the structural unit 18 is offered up and, particularly directly, is arranged on the store housing 3, particularly such that the housing 16, particularly directly, is mechanically connected to the store housing 3. As a result, the return and the feed are fluidically connected to the energy store 2, particularly to the flow channel.

In the first embodiment, the structural unit 18 comprises a bypass valve element 19, which is also simply described as a bypass valve. The bypass valve is arranged in the housing 16, and thus in the feed and in the bypass line. In particular, the bypass valve is arranged, for example, at the connection point V2, particularly in the feed. The bypass valve is switchable between a supply state V and a bypass state U, wherein the bypass valve represented in FIG. 1 is in the bypass state U. In the supply state V, temperature control fluid flowing in the feed is conveyable to the energy store 2 via the feed, and thus be admitted to the energy store 2, particularly to the store housing 3, and more particularly to the flow channel, particularly from the exterior, i.e. from the environment 6. To this end, for example, in the supply state V, a first longitudinal region L1 of the feed, via the bypass valve, is fluidically connected to a second longitudinal region L2 of the feed. The longitudinal region L1, in the direction of flow of temperature control fluid flowing in the feed, is upstream of the bypass valve and upstream of the longitudinal region L2, upstream of the outlet 9 and upstream of the energy store 2, such that the longitudinal region L2 is arranged downstream of the longitudinal region L1, downstream of the bypass valve, upstream of the outlet 9 and upstream of the energy store 2.

If, in the supply state V, the bypass line, by way of the bypass valve at the connection point V2, is isolated from the longitudinal region L1 and particularly from the longitudinal region L2, particularly from the feed, temperature control fluid flowing in the feed is not tapped-off from the feed and admitted to the bypass line.

In the bypass state U, however, the longitudinal region L1 is isolated from the longitudinal region L2 by way of the bypass valve, and the longitudinal region L1 is fluidically connected via the bypass valve to the bypass line (bypass line element 17) at the connection point V2. Accordingly, temperature control fluid flowing in the longitudinal region L1 is tapped-off from the feed via the bypass valve at the connection point V2, and admitted to the bypass line, such that temperature control fluid flowing in the longitudinal region L1 cannot flow from the longitudinal region L1 to the longitudinal region L2, and thus into the energy store 2. Temperature control fluid which is admitted to the bypass line flows through the bypass line and, by way of the bypass line, is conveyed to the connection point V1, and is admitted to the return at the connection point V1. Temperature control fluid flowing in the bypass line does not flow into the energy store and does not flow through the energy store. Accordingly, in the bypass state U, temperature control fluid flowing in the feed can be tapped-off from the feed via the bypass valve, admitted to the bypass line and, via the bypass line, admitted to the return, bypassing the energy store 2.

The bypass valve thus described, preferably by electrical devices, can at least be switched from the supply state V to the bypass state U, for example by way of an electronic computing device which is not represented in the figures. The structural unit 18 moreover comprises a temperature sensor 21, which is arranged in the housing 16 and in the feed, by way of which a temperature of temperature control fluid flowing in the feed can be detected. In the embodiment represented in FIG. 1, the temperature sensor 21, in the direction of flow of temperature control fluid flowing in the feed, is arranged downstream of the bypass valve.

Moreover, in the embodiment represented in FIG. 1, the structural unit 18 comprises a valve element 20 arranged in the housing 16, which is arranged in the return. By way of the valve element 20, any flow of temperature control fluid to the energy store 2 from the return, via the inlet 14, can be prevented. In the first embodiment, the valve element 20 is switchable, for example mechanically, hydraulically or electrically, between a connecting state VZ and an isolating state T. In the connecting state VZ, in the direction of flow of temperature control fluid flowing in the return, and thus flowing away from the energy store 2, arranged upstream of the valve element 20, a third longitudinal region L3 of the return, via the valve element 20, is fluidically connected, in the direction of flow of temperature control fluid flowing in the return, and thus flowing away from the energy store 2, downstream of the longitudinal region L3 and downstream of the valve element 20, to a fourth longitudinal region L4 of the return. It can be seen that, in the direction of flow of temperature control fluid flowing in the return, the longitudinal region L3 is arranged upstream of the longitudinal region L4 and upstream of the outlet 15, and the longitudinal region L3 is arranged downstream of the inlet 14. The longitudinal region L4 is arranged downstream of the longitudinal region L3 and downstream of the valve element 20, and upstream of the outlet 15. It can moreover be seen that the connection point V1 is arranged in the longitudinal region L4. In the isolating state T, the longitudinal regions L3 and L4 are separated from one another by way of the valve element 20, such that temperature control fluid which is discharged from the bypass line and admitted to the longitudinal region L4 at connection point V1 cannot flow back into the energy store 2 from the longitudinal region L4 via the valve element 20, the longitudinal region L3 and the inlet 14. It can thus be securely prevented, for example in the event of a fault, that an excessive quantity of temperature control fluid is admitted to the energy store 2 in an undesirable manner.

In particular, the bypass valve is, for example, an electrically actuated or actuatable bypass valve in the temperature control circuit. Both the return and the feed, together with the bypass line, the bypass valve and the valve element 20, and the temperature sensor 21, are integrated in the housing 16 or in the structural unit 18. In particular, by way of the valve element 20, any unintentional backflow or oversupply of temperature control fluid to the energy store 2, which is also simply described as a store, can be prevented. The return is also described as a return path, in which the valve element 20 is integrated which, for example, is mechanically, hydraulically or electrically actuatable or actuated. The bypass valve element 19, the valve element 20 and the temperature sensor 21, together with, preferably, the return, the feed and the bypass line, are elements or components which are integrated in the common housing 16 for components, and which form the structural unit 18.

For the achievement of a particularly space-saving arrangement, and in the interests of maintaining the requisite quantity or number of lines for the conveyance of temperature control fluid as low as possible, the structural unit 18 is or can be fitted directly to the energy store 2, particularly to the store housing 3, whereby it is understood that the housing 16 and the store housing 3 are preferably in direct contact or, for example, that the housing 16 engages with the store housing 3 by the interposition of preferably exactly one sealing element which, in particular, is configured separately from the store housing 3 and/or separately from the housing 16. By way of the sealing element, for example, the outlet 9 and the inlet 14, or the feed and the return, in particular, are sealed vis-à-vis the environment 6. As temperature control fluid can bypass the energy store 2 via the bypass line, it can be ensured that other components arranged in the temperature control circuit, additionally to the energy store 2 and which are arranged, for example, in the direction of flow of temperature control fluid flowing in the temperature control circuit, downstream of the connection point V1, will continue to be supplied with temperature control fluid, even though, particularly in the interests of safety, the energy store 2 has been shut off, and the bypass valve element 19 is thus in the bypass state U, and the valve element 20 is preferably in the isolating state T.

Figure 2:
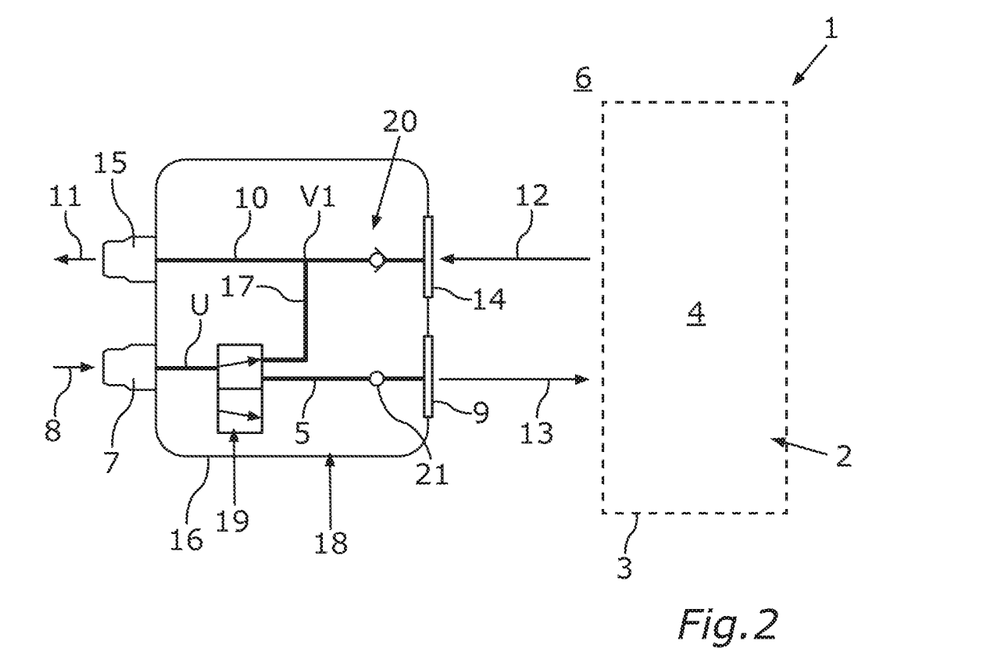
FIG. 2 shows a sectional schematic representation of a second embodiment of the temperature control device.

FIG. 2 shows a second embodiment of the temperature control device 1. The second embodiment differs particularly from the first embodiment, in that the valve element 20 in the second embodiment is particularly configured in the form of a spring-loaded non-return valve, which permits a flow of temperature control fluid from the longitudinal region L3 via the non-return valve to or into the longitudinal region L4, but which prevents any reverse flow of temperature control fluid from the longitudinal region L4 via the non-return valve to the longitudinal region L3. Costs can be kept particularly low as a result.

Figure 3:
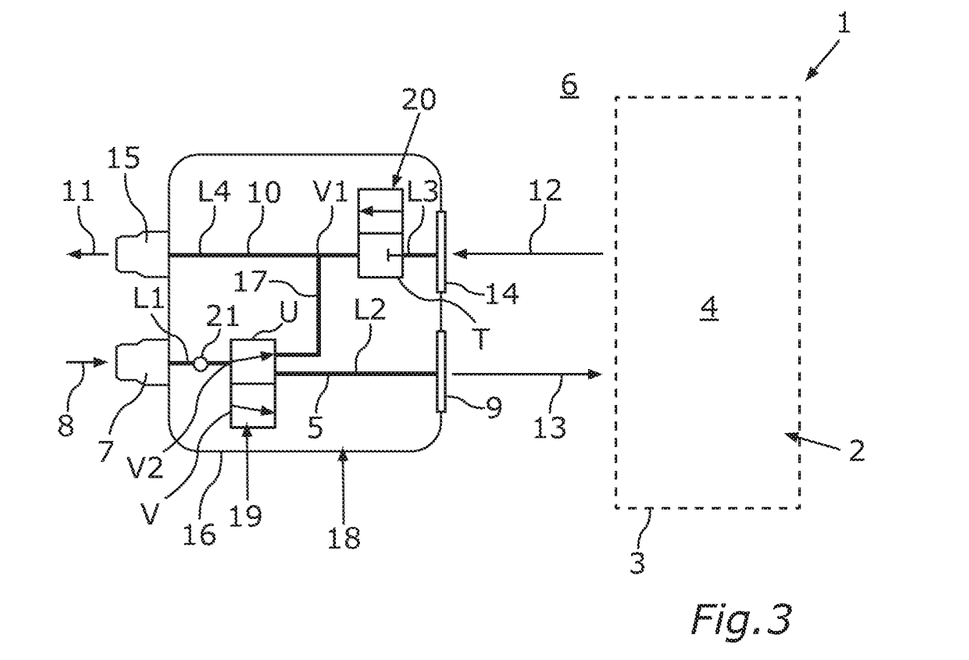
FIG. 3 shows a sectional schematic representation of a third embodiment of the temperature control device.

FIG. 3 shows a third embodiment of the temperature control device 1. The third embodiment is particularly distinguished from the first embodiment, in that the temperature sensor 21 is arranged upstream of the bypass valve element 19 and, in particular, upstream of the connection point V2.

Figure 4:
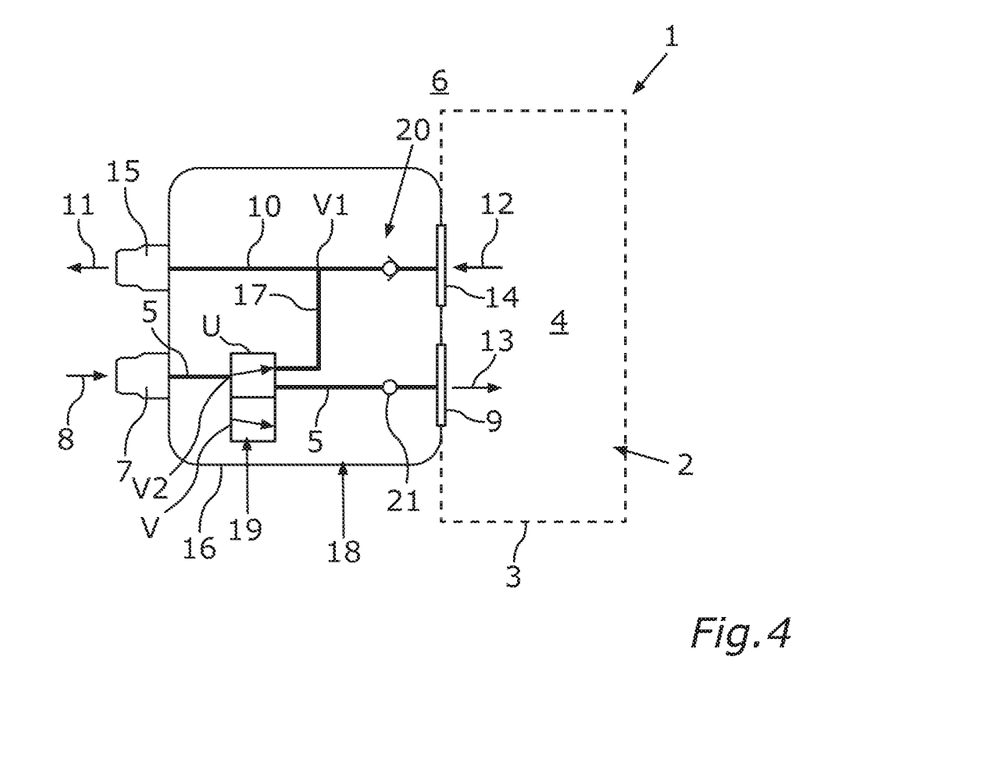
FIG. 4 shows a sectional schematic representation of a fourth embodiment of the temperature control device.

Finally, FIG. 4 shows a fourth embodiment of the temperature control device 1. The fourth embodiment only differs from the third embodiment, in that the valve element 20 is particularly configured in form of a spring-loaded non-return valve. It is further represented in FIG. 4 that the structural unit 18 is fitted directly to the store housing 3.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE SYMBOLS

1 Temperature control device
2 Energy store
3 Store housing
4 Location space
5 Feed line element
6 Environment
7 Inlet
8 Arrow
9 Outlet
10 Return line element
11 Arrow
12 Arrow
13 Arrow
14 Inlet
15 Outlet
16 Housing
17 Bypass line element
18 Structural unit
19 Bypass valve element
20 Valve element
21 Temperature sensor
L1 Longitudinal region
L2 Longitudinal region
L3 Longitudinal region
L4 Longitudinal region
T Isolating state
U Bypass state
V Supply state
VZ Connecting state
V1 Connection point
V2 Connection point

What is claimed is:

1. A temperature control device for temperature control of an electrical energy store for a motor vehicle, the temperature control device comprising:
a feed line element which is flushable by a temperature control fluid for the temperature control of the energy store, and via which the temperature control fluid flowing in the feed line element can be admitted to the energy store, and
a return line element which is flushable by the temperature control fluid, and via which temperature control fluid flowing in the energy store can be evacuated from the energy store, wherein:
the feed line element and the return line element are arranged in a housing which is common to the feed line element and the return line element, and in which housing a bypass line element which is fluidically connected or connectable to the feed line element and the return line element is arranged, by way of which bypass line element the energy store can be bypassed by the temperature control fluid, and
the feed line element, the return line element, the bypass line element, and the housing together form a stand-alone structural unit that is fitted independently of the energy store.

2. The temperature control device according to claim 1, wherein a bypass valve element is arranged in the housing, which bypass valve element is switchable between:
a supply state, in which the temperature control fluid flowing in the feed line element can be admitted via the feed line element to the energy store, and
a bypass state, in which the temperature control fluid flowing in the feed line element is tapped-off from the feed line element via the bypass valve element, admitted to the bypass line element and admitted via the bypass line element to the return line element, bypassing the energy store.

3. The temperature control device according to claim 2, wherein the bypass valve element is electrically switchable, at least from the supply state to the bypass state.

4. The temperature control device according to claim 3, wherein a temperature sensor is arranged in the housing and in the feed line element, by way of which temperature sensor a temperature of the temperature control fluid flowing in the feed line element is detectable.

5. The temperature control device according to claim 4, wherein the temperature sensor is arranged upstream or downstream of the bypass valve element.

6. The temperature control device according to claim 1, wherein a valve element is arranged in the housing and in the return line element, by way of which valve element a flow of the temperature control fluid from the return line element to the energy store is preventable.

7. The temperature control device according to claim 6, wherein the valve element is configured in a form of a spring-loaded non-return valve.

8. The temperature control device according to claim 6, wherein the valve element is switchable between:
a connecting state, in which a first longitudinal region of the return line element, arranged upstream of the valve element in a direction of flow of the temperature control fluid flowing in the return line element, and thus flowing away from the energy store, is fluidically connected via the valve element to a second longitudinal region, arranged downstream of the first longitudinal region and downstream of the valve element, in the direction of flow of the temperature control fluid flowing in the return line element, and thus flowing away from the energy store, and
an isolating state, in which the first longitudinal region and the second longitudinal region are fluidically isolated from each other by the valve element.

9. The temperature control device according to claim 8, wherein the valve element is mechanically, hydraulically or electrically switchable from the connecting state to the isolating state and/or from the isolating state to the connecting state.

10. A motor vehicle comprising the temperature control device according to claim 1.

* * * * *